United States Patent
Pinnow et al.

[11] 3,778,132
[45] Dec. 11, 1973

[54] OPTICAL TRANSMISSION LINE

[75] Inventors: Douglas Arthur Pinnow, Berkeley Heights; Legrand Gerard Van Uitert, Morris Township; John Charles Williams, Whippany, all of N.J.

[73] Assignee: Bell Telephone Laboratories, Incorporated, Murray Hill, Berkeley Heights, N.J.

[22] Filed: Oct. 6, 1972

[21] Appl. No.: 295,718

[52] U.S. Cl. ............ 350/96 WG, 65/3, 65/DIG. 7, 350/96 R
[51] Int. Cl. ................................ G02b 5/14
[58] Field of Search ................ 350/96 WG

[56] References Cited
UNITED STATES PATENTS

| | | | |
|---|---|---|---|
| 3,320,114 | 5/1967 | Schulz | 350/96 GN UX |
| 3,647,406 | 3/1972 | Fisher | 350/96 WG |
| 3,659,915 | 5/1972 | Maurer et al. | 350/96 WG |

*Primary Examiner*—John K. Corbin
*Attorney*—W. L. Keefauver et al.

[57] ABSTRACT

Optical transmission lines suitable for transmitting electromagnetic radiation within the visible spectrum and adjoining portions of the infrared and ultraviolet spectra consists of a pure amorphous silica core clad by a $B_2O_3$-modified silica cladding. The cladding may manifest a substantial uniform refractive index of a value at least 0.1 percent less than that of the core or may be graded to such a lowered value.

12 Claims, 2 Drawing Figures

OPTICAL TRANSMISSION LINE

BACKGROUND OF THE INVENTION

1. Field of the Invention

The invention is concerned with glass transmission lines for use within the visible and near-visible spectra.

2. DESCRIPTION OF THE PRIOR ART

The possibility of communications systems utilizing coherent or incoherent carriers in the visible and near-visible spectra continues to be of interest. Important considerations include the inherently increased bandwidth resulting from the higher frequencies involved and the decreased space requirements for transmissions lines if used. The latter is emerging as an extremely significant factor particularly in urban areas where cable space is at a premium. This problem is aggravated by the introduction and growing acceptance of a broad bandwidth systems, for example for data transmission, rapid facsimile systems, and PICTUREPHONE or other video transmission. Even where requirements are such that the need may not exist for the full bandwidth capability of light communications systems, a comparison, for example, between an optical transmission line and a microwave transmission line operating at the same bandwidth, may result in a preference for the optical system.

While many transmission media have been proposed and are under study for guided light systems, the glass transmission line is, at this time, perhaps closest to commercial fruition. It appears very likely that there will soon be available very thin flexible glass fibers of sufficiently low insertion loss to be feasible.

Many glassy media have been considered and it is still too early to determine what the long term preference may be. However, again with a view to near-term solution, it is apparent that fused silica, $SiO_2$, is an exceedingly promising media for transmission line use in the visible and near-visible spectra. Bulk samples showing an insertion loss of less than 2 dB per kilometer at 1.06 micrometers are now available. Fiber drawing techniques now under study show considerable promise, and it is expected that fiber lines having insertion losses approaching those of the bulk material may soon result.

Thus far, consideration has been given to the medium through which all or most of the wave energy is transmitted. A second consideration involves the guiding function of the line. Most contemplated transmission line structures contemplate a region enveloping the transmission medium. This region, of somewhat lower refractive index than that of the transmission medium itself, may take the form of a cladding of uniform refractive index or of graded index attaining a minimum at a position spaced from the core.

In consequence of the above, there has been a widespread effort to fabricate a clad structure utilizing $SiO_2$. Since this material itself has a rather low refractive index, known prior work has taken the approach of a silica clad-silica core structure with the core index increased by suitable doping. Titania, $TiO_2$, for example, has been used in small quantity (about 1.0 percent by weight) resulting in index increase in the core of the order of the desired level of about 0.3 percent. This approach cannot be ignored but results to date have been somewhat disappointing. Insertion loss for sample structures of this design have been found to be at a level higher than expected for pure silica. Comparison with undoped fibers of similar starting material indicates an increase both in scattering loss and in absorption loss.

SUMMARY OF THE INVENTION

The inventive transmission line structure utilizes the approach complementary to that of the prior art. The core section through which most of the wave energy travels is composed of high purity undoped silica. The requirement of an encompassing section is met by use of silica evidencing a lowered refractive index for the wave energy of concern. Lowering to the required level, of the order of at least one-tenth percent less than that of the core, is accomplished by admixing boron oxide, $B_2O_3$, with the silica. Even though this $B_2O_3$ itself has a refractive index of approximately the same value as that of silica in the visible and near-visible spectra, it is found that substantial lowering of index is accomplished by use of $SiO_2/B_2O_3$ mixtures in which the molecular ratio is from 2:1 to 30:1. The encompassing member may be applied as a single layer cladding or it may be incorporated in such way as to approach a structure evidencing the desirable parabolic index rating.

The invention resides primarily in the described implementation of a desired objective. The undoped silica core manifests the very low insertion loss already associated with this excellent transmission medium. While most of the wave energy is transmitted through this core, a significant fringing portion travels through the guiding medium—usually a cladding. Such a cladding of $B_2O_3$-modified silica, in accordance with the invention, is substantially anhydrous and OH-free so that absorption loss is not inherently increased above that of the core. Scattering loss, while somewhat increased, probably due to the random distribution of the boron groupings, is less significant in the cladding than is the similar increased loss in the core of the complementary prior art structure.

Index differentials or gradients as well as other designed parameters for preferred transmission line structures are described and are of concern in defining preferred embodiments of the invention.

DETAILED DESCRIPTION

1. The Drawimg

Figure 1:
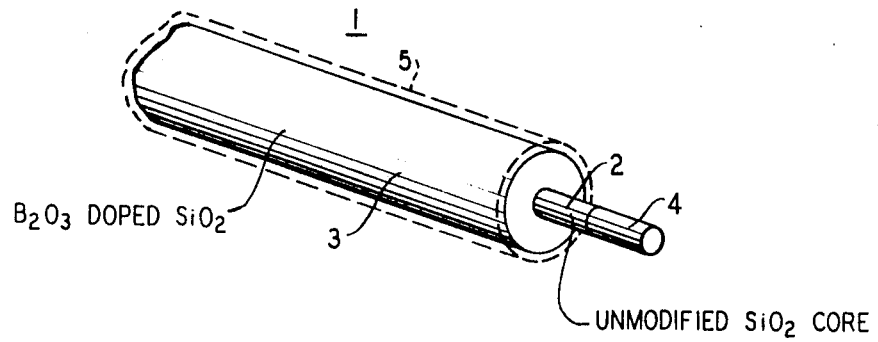
FIG. 1 is a perspective view of a section of a transmission line structure in accordance with the invention.
Figure 2:
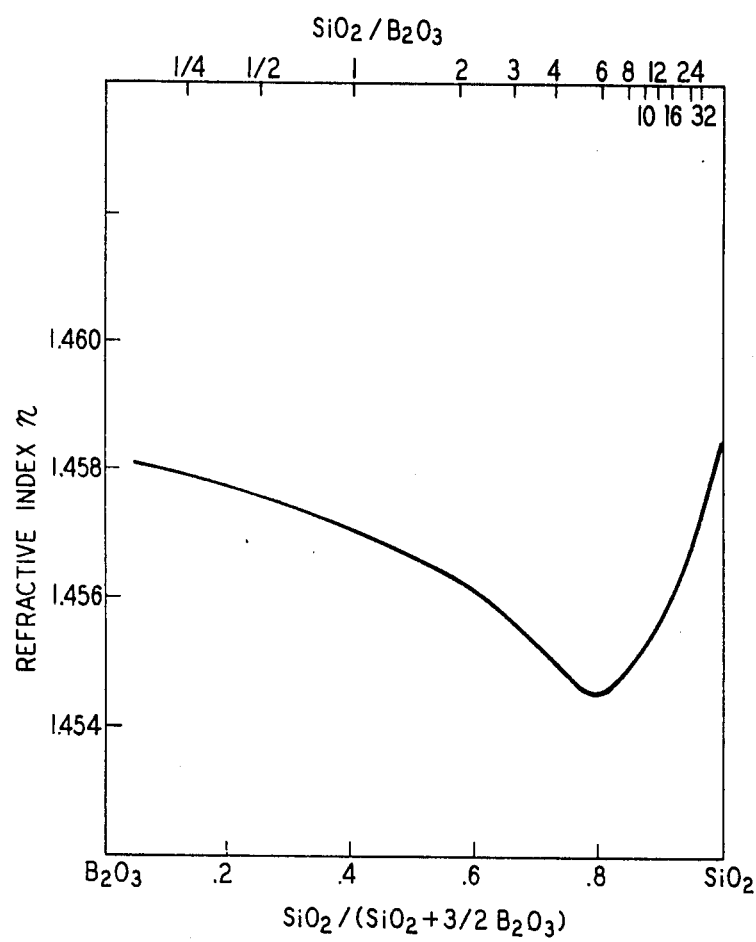
FIG. 2, on coordinates of refractive index $\eta$ for an exemplary wavelength on the ordinate and composition $(SiO_2/(SiO_2 + 3/2\ B_2O_3)$ and $SiO_2/B_2O_3)$ on the abscissa, is a plot showing the experimentally determined relationship between these two parameters.

FIG. 1 depicts a portion of an optical transmission line 1 constructed of a core section 2 of unmodified, high purity $SiO_2$ and a guiding section shown as cladding 3 composed of $B_2O_3$-modified $SiO_2$. The guiding section (cladding 3) may, as discussed, be a single layer of substantially uniform index or two or more layers with each successive layer being of lower index than that underlying so as to approximate a parabolic gradient of particular utility for multimode structures. Cladding 3 may itself, in the alternative, be of graded composition. Also shown is an exemplary means 4 for introducing and/or extracting wave energy into line 1. In this instance, means 4 consists of a section of closely matching index. Means 4 may constitute a coupling between line 1 and a transmitting or detecting means not shown. An additional layer 5, shown in phantom, is a shielding layer designed to avoid crosstalk between adjoining lines. It may consist of any highly absorbent material which is absorbent of the wave energy being transmitted. Exemplary shielding materials for operation in the visible and near-visible spectra are carbon impregnated polyethylene, vapor deposited chrome metallization, and black pigmented polyester resin or paint. While the form of data presented in FIG. 2 is fairly representative for the entire visible spectrum, as well as portions of the near infrared and near ultraviolet for which $SiO_2$ is sufficiently transparent, the actual numbers are those for a refractive index $\eta$ near 0.58 micrometers. Terminal values indicated are approximately 1.4585 for $SiO_2$ and 1.4582 for $B_2O_3$. Mixtures of the two materials result in a lowering of $\eta$ over the entire range and reach a minimum of approximately 1.4545 at a value of $SiO_2/(SiO_2+3/2B_2O_3)$ of 0.8. This corresponds with an $SiO_2:B_2O_3$ ratio of 6:1. Compositions in a range centering about this minimum, prepared as described in the Detailed Description, are substantially free of absorption attributable to $H_2O$ or OH content.

2. Composition

Cladding materials, in accordance with the invention, are $B_2O_3$-modified fused silica. In common with the core material unintentional impurity content is, in general, kept at a very low level. Both silica and boron trioxide are available or may be purified to levels of the order of 99.9999 percent based on weight, and with certain exceptions, such as Li, Na and H, it is generally desirable that materials be of this purity level. However, while this level assures materials adequate for the invention, impurity content is of primary concern with regard to materials which have a significant effect on scattering or absorption. From the standpoint of scattering, loss increases as the refractive index and concentration of the inclusion varies from that of silica. The refractive index of $SiO_2$, again measured for the illustrative wavelength value of 0.58 micrometers, is 1.4585 (compared with vacuum for which the value of $\eta$ is set as equal to unity). From the figure description, it is seen that the value for $B_2O_3$, under the same circumstances, is quite close, i.e., 1.4582. This represents a percentage differential of about 0.02 percent. For optimum performance, all impurities having refractive index values which deviate by more than about 0.05 percent should be kept to a level below about 0.2 percent by weight.

Insertion loss of a transmission line of the type under discussion is, in its limit, due to absorption and scattering components of the same order of magnitude. At 1.06 micrometers, the absorption component of the insertion loss for $SiO_2$ may be below 1dB per kilometer. Impurities having absorption levels at a wavelength of concern should be kept at or below a level sufficient to contribute an approximately equal loss. Maintenance of total transition metal ion impurities below the indicated level of $10^{-4}$ percent by weight is generally sufficient for this purpose.

Previous work of the $B_2O_3$ system has been misleading. Values given by G. W. Morey in *Properties of Glass* 2nd Ed., Reinhold Publishing Company, New York, 1954, pp. 370-372, indicate values of refractive index lower than that for silica in the high $B_2O_3$ region where the lowered values can be attributed to the presence of excessive amounts of water. Water, or more properly $OH^-$, inclusion is undesirable in an optical transmission line; and, in fact, the water content level, sufficient to produce the index lowering observed by Morey, is well above the 0.2 weight percent impurity content limit set forth above. OH absorption is not easily minimized at low $SiO_2$ content, i.e., mixtures in which the ratio of $SiO_2$ to $B_2O_3$ is less than 2:1 on a molecular basis. Low silica content results in compositions which are susceptible to water attack and this is a second, although related, reason for the expressed minimum in the silica to boron trioxide ratio.

The upper limit on the $SiO_2:B_2O_3$ ratio is 30:1 or, preferably, 20:1. The upper limit is prescribed by a required difference in the refractive index. For most purposes, the differential should be at least 0.1 percent (the percentage change in indices are about 0.15, 0.22, 0.15, 0.1 for ratios of $SiO_2/B_2O_3$ of 2:1, 4:1, 20:1 and 30:1.

From FIG. 2 it is seen that a maximum differential in refractive index is attained for a level of about a value of 0.8 for the fraction $SiO_2/(SiO_2 + 3/2 B_2O_3)$ equal to an $SiO_2/B_2O_3$ ratio of about 6:1. The differential $\eta$ value for this minimum is generally from 0.2 to 0.3 percent depending on the degree of mixing of the starting materials and their impurity content. Generally, the best mixed materials of highest purity result in the greatest differential $\eta$ value. Transmission structures may desirably use this maximum differential; and, accordingly, a still more preferred compositional range expressed in terms of molecular fraction $SiO_2/B_2O_3$ is from about 6:1 to 20:1 (corresponding with values of from about 0.8 to about 0.95 in terms of the abscissa values of FIG. 2). Chemical stability (freedom from water attack) are considered in dictating this range.

Ranges set forth above were determined on the basis of materials and minimization of the linear expansion coefficient difference between core and cladding with acceptable levels of $H_2O$ or OH— as based on infrared absorption measurements conducted over the frequency range of from 0.6 to 3.0 micrometers. A value of the extinction coefficient of 20 cm$^{-1}$ at 2.8 micrometers, considered to correspond with an OH— level content of below 0.2 percent by weight, was considered to indicate absence of this contaminant. Thermal expansion values of the $B_2O_3$-modified silica glass is within the range of from $0.5 \times 10^{-6}$ to $2 \times 10^{-6}$ which is sufficiently closely matched to that of the pure fused silica core to prevent damage due to changing temperature in clad structures.

3. Material Preparation $B_2O_3$-modified silica may be prepared by any technique suitable for the preparation of optical quality silica glass. See, for example, "Properties and Structure of Vitreous Silica 1" by R. Bruckner, *Journal of Non-Crystalline Solids* Vol. 5, pp. 123-175 (North-Holland Publishing Co.).

Samples yielding some of the data reported in this description were prepared as follows. $SiO_2$ and $B_2O_3$ were milled together overnight in a plastic jar using plastic coated spinners. The milled material was loaded into 100 ml platinum crucibles and at least, partially, fused at about 1,350°C for several hours in an electric furnace. The fused materials were then heated again from 1,500° to 2,000° C, depending on $SiO_2$ content, in an iridium crucible to obtain clear glasses. Test pieces were cut out of the fused mass and polished to suitable dimensions for measurements.

Index of refraction of the test pieces was determined using an Abbe Refractometer.

4. Transmission Line Fabrication

The principles for forming optical glass fibers are well established. They are described in the technical literature and known to those familiar with the art. In the way of illustrating these principles and for this discussion, two of the most commonly used methods for preparing glass fibers for optical waveguides are described; namely, the preform method and double crucible method.

In the preform method, a rod of the core glass is positioned along the central axis of a tube of cladding glass of similar length. The preform assembly is supported in a fixture attached to a feed mechanism, for positioning in a source of heat sufficient to soften the glasses. Examples of heat sources include resistance furnaces, gas torches, rare glass plasmas, and image focusing devices.

Temperatures of approximately 1,900° C are required to reduce the viscosity enough for drawing the glasses reported in this disclosure. Upon heating, the tips of the rod and tube soften into a taper from which a fiber is drawn and attached to a winding drum that is capable of high rotation and translation. In general, only a single layer of fiber is wound on a drum to prevent mechanical damage that could result from contact between adjacent layers.

In general, the ratio of the rod and tube diameters is maintained in the fiber core and cladding. The diameter of the fiber is controlled by the size of the rod and tube, the rate of preform feed, temperature of the heat sources, and peripheral speed of the winding drum. In order to optimize the quality of the fiber, experience has shown that the major surfaces of the rod and tube should be smooth, preferably having a polished finish. In addition, the evacuation of the space separating the rod and tube is advantageous for reducing bubble formation along the core-cladding interface.

The double crucible method eliminates the need for a feed mechanism. Instead, the core and cladding glasses flow simultaneously through concentric orifices to merge and be drawn into a fiber in much the same manner as described for the preform method. The inner crucible contains the glass composition for the core, and the outer crucible contains the glass composition for the cladding of the fiber. The flow of the glasses by gravity or pressurization is controlled by their viscosity-temperature relation.

Either of the methods is adaptable to the fabrication of optical waveguides using the glasses described herein.

5. Design Considerations

The following considerations are applicable to the design of any clad optical transmission line. While much of the information is in the literature, it is not readily available from one source.

Of the host of potential fiber designs that are being considered, one stands out as having recognized simplicity and good light guiding characteristics. This is the core-clad fiber shown in FIG. 1 in which the index of refraction of the core is $\Delta \eta$ greater than the index of refraction of the cladding $\eta$. By appropriate choice of the core radius, $a$, and $\Delta \eta$, this type of fiber can be either single or multimode. In either case, most of the optical energy of the guided modes is in the core region, although a fraction of the power ($\approx 20$ percent for single mode and 1 to 2 percent for a highly multimode structure) is in the cladding. The overall optical attenuation, $\alpha_{tot}$, for such a fiber is a superposition of the weighted attenuations in core and cladding materials:

$$\alpha_{tot} = (\text{percent of optical energy in core}) \alpha_{core}$$
$$+ (\text{percent of optical energy in clad}) \alpha_{clad} \quad (1)$$

For highly multimode core-clad fibers each of the many guided modes has a well defined velocity of propagation. The fastest mode has its energy directed straight down the axis of the fiber. The off axis modes are slower because their energy is reflected from the core-clad interface many times as they weave their way down a long fiber. This difference in mode velocities limits the information bandwidth (or bit rate) of fiber optical waveguides since energy in an extremely narrow pulse of light directed into the various guided modes of a fiber will be spread out in time as the energy propagates down the length of the fiber. When the spreading reaches the point where adjacent pulses in a bit stream sufficiently overlap, the transmitted information is lost.

Based on well-known principles it can be shown, that the information bandwidth of a highly uniform and highly multimode fiber is related to the difference in refractive indices between the core and the clad. Specifically, $$\Delta \eta \leq c/L \times B \quad (2)$$

where $c$ is the velocity of light ($3 \times 10^5$ km/sec), $L$ is the length of the fiber, and $B$ is the maximum information bandwidth. For example, in order to transmit a bandwidth of 30 MHz over a relatively short distance of 1 km, the value of $\Delta \eta$ must be 0.01 or less. It is apparent from the above equation that long distance and broadband transmission require small values of $\Delta \eta$. In fact, the smaller the better. Unfortunately, if $\Delta \eta$ becomes too small the guided light will tend to "leak" excessively out of the fiber when it passes minor fabrication imperfections which inevitably occur during manufacture. The smaller $\Delta \eta$, the greater this loss effect becomes. Thus, to keep optical loss to a reasonable value $\Delta \eta$ must have some minimum value.

For communication applications the useful range of $\Delta \eta$ is between 0.0001 and 0.10 and the preferred range is between 0.001 and 0.02. It should be noted that the $\Delta \eta$ of the SiO$_2$ core and the preferred composition clad range of the invention is in the preferred range.

Although the above discussion concerns only multimode fibers, useful and preferred ranges for $\Delta \eta$ are also applicable to single mode core-clad fibers. In the case of the single mode fibers the reason given above for the lower limit on $\Delta \eta$ is still applicable. However, there is obviously no pulse broadening effect due to differences in mode velocities so that Eq. (2) cannot be used to set an upper limit on $\Delta \eta$. In this single mode case the upper limit is due simply to the fact that the fiber core radius, $a$, is constrained to $$a \leq \lambda/(4 \sqrt{2\eta\Delta\eta}) \quad (3)$$

where λ is the free space wavelength of the optical signal and $\eta$ is the index of refraction of the cladding. From this well known equation, it can be seen that as $\Delta\eta$ increases $a$ must decrease. In fact, when $\Delta\eta = 0.02$ one finds $a \approx \lambda$. There are two problems associated with such small core sizes. The first is the practical problem of the mechanical precision necessary to align such small cores for splicing etc. The second problem is fundamental and is associated with non-linear optical effects such as stimulated Brillouin and Raman scattering, which occur when modest optical power (i.e., 10mW) is confined to a very small cross section (i.e., 1$\mu$ square). If these non-linear effects occur, useful communication is precluded. A minimum core diameter of the order of about 3 micrometers is prescribed in view of these and other practical considerations. A maximum core diameter of less than 200 micrometers is prescribable to assure mechanical flexibility of the transmission line. The preferred core size is in the range of 30 to 100 micrometers.

The cladding thickness of a core-clad fiber optical waveguide must be sufficiently great that only a very small amount of optical energy from the guided modes penetrates all the way through the cladding to its outer surface. It may be presumed that a substantial fraction of the energy that does reach this outer surface will be lost by absorption due to interaction with surface contaminants or with an absorbing coating that is purposely applied to the fiber to avoid leakage of optical energy from one fiber into adjacent fibers in a bundle. Without such a coating excessive crosstalk between fibers might occur. To avoid excessive optical loss and/or crosstalk, the cladding thickness must be greater than some minimum value. On the other hand, the overall diameter of the fibers must not be too large or the mechanical flexibility of the fiber will be lost.

For communication applications the useful range of cladding thickness, $t$, is $$10\mu \leq t \leq 250\mu$$

while the preferred range is $$25\mu \leq t \leq 100\mu.$$

An optimum transmission line designed for many purposes known as GRIN (graded refractive index) is described in *Applied Optics*, Vol. 9, pp. 753–759, March 1970.

In the GRIN fiber design, the index of refraction varies parabolically with distance from the core axis. The figure below shows the difference between the core-clad and GRIN fibers. The desirable and well-known feature of the GRIN design is that all guided modes propagate with the same velocity, even in a highly multimode structure. Thus, the limitation due to Eq. (2) is no longer applicable and the GRIN fiber is inherently capable of very broad band transmission (as is the single mode fiber).

It is convenient to think of the core-clad fiber design as being the first approximation to the GRIN structure. A better approximation to the GRIN design results by using two or more cladding layers having indices of refraction which decrease with increasing radial distance from the fiber axis. Compositions for these multiple layers may be selected from the $SiO_2$-$B_2O_3$ system by reference to FIG. 1. During drawing of the fiber some mixing is expected to occur at the core-clad and clad-clad interfaces which tends to smooth out the abrupt discontinuities in index of refraction. This effect helps to improve the approximation to a parabolic distribution. Further enhancement may result from high temperature heat treatment of the fiber.

A GRIN type of fiber may also be made by varying the control parameters during chemical vapor deposition of $B_2O_3$-modified $SiO_2$ on a very thin silica core.

What is claimed is:

1. Glass transmission line for the transmission of electromagnetic radiation within the wavelength range of from 0.5 to 2.0 micrometers, said line consisting essentially of a core member manifesting a first refractive index for said wave energy and a cladding about said core, said cladding including at least one layer having a second refractive index for said wave energy which is lower than the said first index, said second index being of a value at least 0.1 percent lower than said first index at least within a region in the neighborhood of a periphery of the said cladding, in which said core and said cladding are both primarily amorphous $SiO_2$, characterized in that the said core consists essentially of $SiO_2$ and in that the said cladding consists essentially of a mixture of $B_2O_3$ and $SiO_2$ with the $SiO_2/B_2O_3$ ratio at least within the said region being within the range of from 30:1 to 2:1.

2. Transmission line of claim 1 in which the said ratio is from 20:1 to 4:1.

3. Transmission line of claim 2 in which the said ratio is from 20:1 to 6:1.

4. Transmission line of claim 1 in which the core diameter is defined by a region consisting essentially of 99.8 percent by weight $SiO_2$ with transition metal ion impurities no greater than $10^{-4}$ percent and having a maximum refractive index variation of 0.01 percent is from 3 micrometers to 200 micrometers.

5. Transmission line of claim 4 in which the core diameter defining a region consisting essentially of 99.8 percent by weight $SiO_2$ with transition metal ion impurities no greater than $10^{-4}$ percent and having a maximum refractive index variation of 0.01 percent is from 30 micrometers to 100 micrometers.

6. Transmission line of claim 4 in which the cladding thickness defined as the thickness of amorphous material, the composition of which is primarily $SiO_2$ but within which the refractive index has a differential value relative to the said core greater than the variations specified in claim 4 is from 10 to 250 micrometers.

7. Transmission line of claim 6 in which the cladding thickness as defined is from 25 to 100 micrometers.

8. Transmission line of claim 7 in which the core dimension is within the range of from 3 micrometers to 200 micrometers.

9. Transmission line of claim 1 in which the refractive index differential between the said region and the core is from 0.0001 to 0.10.

10. Transmission line of claim 9 in which the refractive index differential between the said region and the core is from 0.001 to 0.02.

11. Transmission line of claim 1 in which the refractive index of the cladding is substantially uniform in the radial direction.

12. Transmission line of claim 1 in which the refractive index of the said cladding is graded with the index decrease in the radial direction away from the said core.

* * * * *

UNITED STATES PATENT OFFICE
CERTIFICATE OF CORRECTION

Patent No. 3,778,132         Dated December 11, 1973

Inventor(s) Douglas A. Pinnow, LeGrand G. Van Uitert, and John C. Williams

It is certified that error appears in the above-identified patent and that said Letters Patent are hereby corrected as shown below:

Column 1, lines 13 and 14, delete "transmissions" and insert --transmission--.

Column 4, line 8, delete "OH" and insert --$OH^-$--.

Column 4, line 37, delete "are" and insert --is--.

Column 4, line 41, delete "OH-" and insert --$OH^-$--

Column 4, line 45, delete "OH-" and insert --$OH^-$--.

Column 5, line 21, "rare glass plasmas" should read --rare gas plasmas--.

Column 6, equation 1, after "clad" insert a period.

Column 6, line 53, delete "is" and insert --are--.

Column 7, line 49, delete "The".

Column 7, line 50, delete entirely.

Column 7, line 51, delete "clad and GRIN fibers."

Column 7, line 65, delete "FIG. 1" and insert --FIG. 2--.

Column 8, claim 4, line 31, delete "is" and insert --as--.

Signed and sealed this 12th day of November 1974.

(SEAL)
Attest:

McCOY M. GIBSON JR.
Attesting Officer

C. MARSHALL DANN
Commissioner of Patents